Patented Sept. 2, 1952

2,609,354

UNITED STATES PATENT OFFICE 2,609,354

MODIFIED RESINS FROM POLYSTYRENES AND ESTERS OF SATURATED ALIPHATIC DICARBOXYLIC ACIDS AND UNSATURATED ALCOHOLS

Orville L. Polly, Long Beach, Calif., assignor to Union Oil Company of California, Los Angeles, Calif., a corporation of California No Drawing. Application December 27, 1948, Serial No. 67,555

9 Claims. (Cl. 260—45.5)

This invention relates to modified polystyrene resins and particularly to polystyrene resins which are plasticized during the latter part of the polymerization or after polymerization to the desired degree is substantially complete by the incorporation of allyl or methallyl succinate.

Polystyrene resins prepared by polymerizing styrene, generally until the molecular weight of the polymer is in the range of 60,000 to 150,000 or 200,000, are transparent, water-white resins which, at ordinary temperatures, are hard and glass-like and possess an undesirable brittleness for many utilizations. These resins are changed into a soft plastic at temperatures between about 175° F. and 190° F. and at higher temperatures they appear to have elastic properties. These polymers are excellent dielectrics and in this respect are superior to polymers containing appreciable proportions of chlorine or other inorganic or organic acid residues, such as polymerized vinyl chloride, vinyl acetate and the like.

Because of the brittleness of the polystyrene resins their use in laminated glass, in coating compositions and the like is rather limited in spite of the fact that their transparency and clarity would make them particularly desirable for such uses. Moreover, because of brittleness at ordinary temperatures the use of these otherwise excellent dielectrics in the field of electrical insulation where flexibility is often required is impractical. Although various plasticizers have been employed to eliminate brittleness in the styrene polymers these plasticizers tend to reduce the dielectric strength of the polymers and tend to reduce the temperature at which softening occurs.

Attempts to improve the characteristics of polystyrenes have included the copolymerization of monomolecular styrene with such other polymerizable materials as monomolecular vinyl chloride, vinyl acetate and the like compounds, the vinyl and allyl esters of saturated and unsaturated dibasic acids and various other types of polymerizable unsaturated compounds. Copolymers produced in this manner are, in some cases, less brittle, show improved tensile strength and increased elasticity. However, such copolymers are, in general, less transparent than polystyrene alone and still require the incorporation of plasticizing agents to produce resins having the desired lack of brittleness.

It is an object of this invention to produce a polystyrene resin free from brittleness and having desirable plastic and elastic properties.

It is a further object of the invention to produce a modified polystyrene resin retaining the transparency of polystyrene, being free from brittleness at low temperatures and having good dielectric properties.

It has been found that these and other objects, which will be hereinafter apparent, are obtained by incorporating allyl succinate in monomeric form or in the form of a low molecular weight polymer in polystyrene under polymerizing conditions. Thus, it has been found that a polystyrene having a molecular weight of at least about 50,000, and preferably 60,000 or more, may be converted into a hard, non-brittle, transparent, water-white resin by adding to the polystyrene between about 3% and about 30 to 40% by weight of monomeric or partially polymerized allyl succinate. The incorporation of the allyl succinate with the polystyrene is accomplished at a temperature at which the polystyrene is plastic and, therefore, will be at a temperature above about 175° F. but below the temperature at which decomposition of the polystyrene occurs; thus, at a temperature below about 500° F. and preferably below about 450° F. Desirably, the temperature will be between about 200° F. and 350° F. The styrene polymer is heated until it is softened sufficiently to permit mixing with the monomeric allyl succinate, as for example at a temperature between 200° F. and 400° F., in a closed vessel, preferably in the absence of oxygen or air, and the desired amount of allyl succinate is then added and sufficiently well mixed with the styrene polymer to produce a homogeneous mass. After the addition of allyl succinate polymerization may be continued for a time sufficient to increase the average molecular weight of the resulting resin to a value not exceeding about 1.5 times the molecular weight of the polystyrene being treated. Thus, if the polystyrene originally had a molecular weight of 50,000 subsequent polymerization with added allyl succinate should not be carried beyond the point at which the average molecular weight of the resulting resin is 75,000. Similarly, if the molecular weight of the polystyrene is 80,000 subsequent polymerization in the presence of allyl succinate should not be continued beyond the point at which the average molecular weight of the product is 120,000. This limitation in the extent of polymerization following addition of allyl succinate or partially polymerized allyl succinate appears to be critical in that if the polymerization is continued substantially beyond this point the resultant resin appears to be cloudy, indicating lack of compatibility of at least some of the components of the resin.

Polymerization of the mixture of polystyrene and allyl succinate may be carried out at temperatures between about 175° F. and 450° F. and preferably between about 200° F. and 350° F.

All of the above limitations apply whether the allyl succinate monomer or the partially polymerized monomer is employed. By partially polymerized allyl succinate is meant homopolymerized allyl succinate with a molecular weight less than about 50,000 and preferably less than about 20,000. Generally, however, as the molecular weight of the allyl succinate polymer increases, the extent to which subsequent polymerization with polystyrene occurs is desirably decreased.

In order to obtain the advantages of this invention it is not essential that substantial polymerization takes place after incorporation of the allyl succinate. Thus, if it is desired to produce a hard resin having extremely good plastic and elastic properties and which is not brittle at ordinary temperatures it is sufficient that the allyl succinate be incorporated in the prepolymerized styrene in the temperature range indicated above, which temperature range is in the range at which polymerization normally occurs. Mixing times of a few hours, such as one or two hours, which are sufficient to produce homogeneous masses but not long enough to cause appreciable polymerization, suffice to produce a resin of desirable characteristics. However, as indicated above, the time may be extended over a period sufficiently long to cause further polymerization of the styrene and of the allyl succinate and/or to cause copolymerization of the polystyrene and the allyl succinate to produce a resin having a molecular weight one and one-half times that of the original polystyrene, or the time may be such as to produce a resin having an average molecular weight intermediate between the molecular weight of the original polystyrene, and the value one and one-half times the molecular weight of the original polystyrene.

Apparently it is important in producing the resins of this invention that the styrene be polymerized to at least about 50,000 molecular weight before copolymerizing with the allyl succinate, particularly where the higher molecular weight polymers or copolymers are the desired products. Cloudy products are obtained when the styrene monomer and the allyl succinate monomer are copolymerized. Moreover, it is found that in copolymerizing the monomers, even though the proportion of the allyl succinate monomer is relatively higher, as for example, around 30 to 40% of the total polymerization charge, the resulting polymers still retain an undesirable brittleness which must be compensated for by the addition of subsidiary plasticizing agents.

As indicated hereinabove polymerization and/or copolymerization according to this invention can be effected with heat alone. Preferably, the polymerization will be carried out in the absence of air, e. g., in a closed system. However, this is not essential as satisfactory plasticized resins have been prepared at suitable temperature in the presence of air. In some instances it may be desirable to employ catalytic agents such as any of those well known for aiding in the polymerization of vinyl-type compounds. Catalysts which are particularly effective are the organic peroxides such as benzoyl peroxide, acetyl peroxide, lauroyl peroxide, and the like and hydrogen peroxide. In some instances inorganic catalysts may be employed; however, their use may be objectionable when it is desired to produce crystal-clear resins of particularly high dielectric strength. Such inorganic catalysts include the perborates, as for example, alkali metal borates, and persulfates, as for example, the alkali metal persulfates. Generally the amount of catalyst employed will be between about 0.5% and 3% of the polymerization charge.

Although it has been shown that the allyl succinate may be added to and mixed with the prepolymerized styrene and the resulting mixture further polymerized or copolymerized in the absence of other agents except catalysts, it is equally feasible to dissolve or disperse the prepolymerized styrene in a solvent in which it is soluble, e. g., an aromatic solvent such as benzene, toluene, xylene and the like or mixtures of these compounds, which solvent is not polymerizable, and add the monomeric or partially polymerized allyl succinate to the solvent solution of polystyrene. This solution of polymerizable materials may then be subjected to polymerizing conditions to produce the desired resin. In this instance the polymerization is effected in a closed system under the vapor pressure of the solvent in order to maintain temperatures in the desired range. These temperatures will be the same as those indicated above for polymerization of the components in the absence of solvent.

As an example of the invention, styrene is polymerized in the absence of catalysts at a temperature of 200° F. until the average molecular weight of the mass is 55,000. At this time 10% by weight, based on the polystyrene, of allyl succinate is added and the mass sufficiently mixed to produce a homogeneous mass, the heating at 200° F. being continued for 36 hours. The resulting resin, having an average molecular weight of 75,000, is non-brittle, has high dielectric strength, and is crystal-clear.

As another example of the invention, styrene is polymerized in the presence of 1% of benzoyl peroxide to an average molecular weight of 75,000 at a temperature of about 210° F. At this time 20% by weight based on the polystyrene of allyl succinate is added and the mixture sufficiently mixed to produce a homogeneous mass. The resulting mixture is maintained at a temperature of about 210° F. for a time sufficient to produce a resin having a molecular weight of 100,000. This resin, although somewhat harder at ordinary temperatures than is one described above, is a non-brittle, crystal-clear plastic having desirable elastic properties at a higher temperature.

As another example of the invention, styrene is polymerized to an average molecular weight of 120,000 using 1% of benzoyl peroxide as a catalyst and a temperature of 225° F. This product is divided into two portions: to the first portion is added 5% by weight of monomeric allyl succinate and the mixture heated and mixed at a temperature of 240° F. for a period of two hours, sufficient to incorporate the allyl succinate and produce a homogeneous mass. The resulting mixture, having an average molecular weight of about 120,000, is an excellent non-brittle, transparent resin having desirable plastic properties. The second portion of polymerized styrene with an average molecular weight of 120,000 is heated to 260° F. and 10% by weight based on the polystyrene of prepolymerized allyl succinate is added. The polyallyl succinate, having a molecular weight of 5,000, is prepared by heating allyl succinate in a closed vessel to a temperature of 210° F. for about twelve hours. The mixture of polystyrene and polyallyl succinate is heated to a temperature of 250° F. for a time sufficient to effect homogenization, at which time a portion of this product is removed and a second portion is heated for an additional 36 hours to effect further polymerization and/or copolymerization. Both of these latter products are hard, non-brittle, crystal-clear plastic resins. The one removed immediately following homogenization has an average molecular weight of about 115,000 and the one removed after additional polymerization has a molecular weight of about 160,000.

In another example of this invention, a polystyrene having a molecular weight of 90,000 is dissolved in four volumes of benzene and to this solution is added 30% based on the polystyrene content of allyl succinate. The resulting solution is placed in a closed vessel and heated to a temperature of 260° F. under the vapor pressure of the solvent. After 48 hours benzene is evaporated from the mixture and the resulting resin, which has a molecular weight of 125,000, is a crystal-clear, non-brittle resin having elastic properties.

Although the above description has been limited to the use of polystyrene and allyl succinate, the alpha-methyl styrene polymers may be used in place of the styrene polymers and when so used are found to produce resins having the same properties as those produced from the polystyrene when treated in the manner described for polystyrene. The term styrene or polystyrene as used herein may be considered to include the alpha-methyl styrene or poly alpha-methyl styrene. Moreover, I may use methallyl succinate in place of allyl succinate with substantially the same results, the resulting resins being of the desirable plastic, crystal-clear type. Thus, resins produced by adding methallyl succinate to polystyrene or poly alpha-methyl styrene with or without further polymerization or copolymerization following the teachings presented herein are of the desirable plastic, non-brittle, transparent type.

Similarly I may employ the allyl and methallyl esters of glutaric and adipic acids in place of the corresponding esters of succinic acid and, in fact, any number of this group of esters may be substituted for the allyl succinate in all of the above utilizations to produce the desirable modified polystyrene resins. Thus, allyl glutarate, methallyl glutarate, allyl adipate and methallyl adipate may be copolymerized with polystyrene or poly alpha-methyl styrene or added to these polymers under polymerizing conditions to produce the described hard, non-brittle plastic resins of this invention. This group of saturated aliphatic dicarboxylic acids can also be defined as those containing more than 3 and less than about 7 carbon atoms per molecule. Apparently if the acid portion of the allyl or methallyl ester contains less than 4 carbon atoms (as would be the case with oxalic and malonic acid esters) the resulting resins lack the clarity and stability of those obtained with the mentioned esters and if the acid portion of the ester contains more than about 6 carbon atoms the resulting resins, prepared according to this invention, do not have the desirable non-brittle characteristics, at least to the desired extent, and require further plasticization.

Molecular weights described herein are determined from viscosity data obtained on toluene solutions of the polymers. The ratio of the viscosity of the polymer solution to the viscosity of pure toluene is known as the relative viscosity. Intrinsic viscosity is calculated from relative viscosity using the equation given by Kraemer, Industrial & Engineering Chemistry, vol. 30 (1938), page 1201, as follows:

$$\text{Intrinsic viscosity in toluene} = \frac{\ln \eta r}{c}$$

where $\eta r$ equals the relative viscosity in toluene solution and $c$ equals concentration in grams of solute per 100 cc. of solution. This equation holds where $c$ approaches zero. Satisfactory results are obtained using concentrations of 0.05 gram of polymer per 100 cc. of toluene solution.

The intrinsic viscosity of the polymer in toluene solution as determined above is equal to a constant times some exponential power of the molecular weight of the polymer. The particular constants employed herein in determining molecular weight were arbitrarily selected from work reported by Goldberg et al. in the Journal of Polymer Science, volume II, page 507 (1947). Thus the following equation is used in calculating molecular weights from intrinsic viscosities. In this equation M represents the molecular weight.

$$\text{Intrinsic viscosity in toluene} = 3.7 \times 10^{-4} \times M^{0.62}$$

It is to be pointed out that other modes of applying the principles of my invention may be employed in addition to those described, and other methods of preparing the polystyrene to be plasticized may obviously be employed within the scope of the invention.

I claim:

1. A plastic, hard, non-brittle resin selected from the class consisting of modified polystyrene and modified poly alpha-methyl styrene resins obtained by heating to a temperature between 175° F. and 450° F. a mixture of a polymer of at least 50,000 molecular weight selected from the class consisting of polystyrene and poly alpha-methyl styrene with an ester selected from the group consisting of the allyl and methallyl esters of saturated aliphatic dicarboxylic acids having from 4 to 6 carbon atoms in the acid molecule and polymers of said esters having molecular weights below about 50,000, for a time sufficient to effect partial polymerization of said mixture and discontinuing said heating when the product has an average molecular weight intermediate between the molecular weight of the original polymer and 1.5 times the molecular weight of the original polymer, the molecular weights of the polymers being determined from intrinsic viscosities of the polymer solution in toluene using the equation:

$$\text{Intrinsic viscosity in toluene} = 3.7 \times 10^{-4} \times M^{0.6}$$

where M equals molecular weight.

2. A resin according to claim 1 in which said ester is a polymerized ester having a molecular weight not greater than about 50,000.

3. A resin according to claim 1 in which said ester is allyl succinate.

4. A plastic, hard, non-brittle modified polystyrene resin obtained by heating a mixture of polystyrene having a molecular weight of at least 50,000 with an ester selected from the group consisting of the allyl and methallyl esters of saturated aliphatic dicarboxylic acids having from 4 to 6 carbon atoms in the acid molecule and polymers of said esters having molecular weights below about 50,000 to a temperature between about 200° F. and about 350° F. for a time sufficient to effect partial polymerization of said mixture and discontinuing said heating when the average molecular weight of the resultant resin is intermediate between the molecular weight of the original polystyrene and 1.5 times the molecular weight of the original polystyrene, the molecular weights of the polymers being determined from intrinsic viscosities of the polymer solution in toluene using the equation:

Intrinsic viscosity in toluene $= 3.7 \times 10^{-4} \times M^{0.6}$ where M equals molecular weight.

5. A resin according to claim 4 in which the ester is allyl succinate.

6. A resin according to claim 4 in which the ester is methallyl succinate.

7. A resin according to claim 4 in which said ester is a polymerized ester having a molecular weight below about 50,000.

8. A process for preparing a plastic, hard, non-brittle resin which comprises heating a mixture of a polymer selected from the class consisting of polystyrene and poly alpha-methyl styrene polymers having a molecular weight of at least 50,000 with an ester selected from the group consisting of allyl and methallyl esters of saturated aliphatic dicarboxylic acids having from 4 to 6 carbon atoms per molecule and polymers of said esters having molecular weights below 50,000, to a temperature between 175° F. and 450° F. for a time sufficient to effect partial polymerization of said mixture and discontinuing said heating when the product has an average molecular weight intermediate between the molecular weight of the original polymer and 1.5 times the molecular weight of the original polymer, the molecular weights of the polymers being determined from intrinsic viscosities of the polymer solution in toluene using the equation:

Intrinsic viscosity in toluene $= 3.7 \times 10^{-4} \times M^{0.6}$ where M equals molecular weight.

9. A process according to claim 8 wherein said heating is effected with the reactants in solution in an aromatic hydrocarbon solvent of the class consisting of benzene, toluene and xylene under a pressure sufficient to maintain at least some of said solvent in the liquid phase.

ORVILLE L. POLLY.

REFERENCES CITED

The following references are of record in the file of this patent:

UNITED STATES PATENTS

| Number | Name | Date |
|---|---|---|
| 2,155,590 | Garvey | Apr. 25, 1939 |
| 2,273,891 | Pollack et al. | Feb. 24, 1942 |

OTHER REFERENCES

Bawn, The Chemistry of High Polymers, N. Y., 1948, page 144.

Mark et al., High Polymeric Reactions, vol. III of High Polymers, N. Y., 1941, page 329.